United States Patent [19]
Spivak et al.

[11] Patent Number: 5,249,426
[45] Date of Patent: Oct. 5, 1993

[54] APPARATUS FOR MAKING AND DELIVERING SUBLIMABLE PELLETS

[75] Inventors: Philip Spivak, Toluca Lake; Alan E. Opel, Monrovia; Scott M. Stratford, Alta Loma; Oleg Zadorozhny, North Hollywood, all of Calif.

[73] Assignee: Alpheus Cleaning Technologies Corp., Rancho Cucamonga, Calif.

[21] Appl. No.: 893,195

[22] Filed: Jun. 2, 1992

[51] Int. Cl.$^5$ .............................................. B29C 43/52
[52] U.S. Cl. ........................................... 62/35; 62/354
[58] Field of Search ...................... 62/10, 35, 12, 354; 220/203, 208, 209

[56] References Cited

U.S. PATENT DOCUMENTS

| | | | |
|---|---|---|---|
| 1,343,480 | 6/1920 | Rutherford | 220/208 X |
| 1,869,346 | 7/1932 | Comer | 62/35 |
| 2,169,410 | 8/1939 | Drane | 220/203 |
| 3,098,361 | 7/1963 | Haase | 62/35 X |
| 3,670,516 | 6/1972 | Duron et al. | 62/35 |
| 3,786,644 | 1/1974 | Rich et al. | 62/35 X |
| 4,033,736 | 7/1977 | Cann | 62/10 |
| 4,325,720 | 4/1982 | Students | 62/35 |
| 4,389,820 | 6/1983 | Fong et al. | 51/410 |
| 4,415,346 | 11/1983 | Love | 62/35 |

Primary Examiner—William E. Tapolcai
Attorney, Agent, or Firm—Sheldon & Mak

[57] ABSTRACT

Disclosed is an improved pelletizer and delivery system for hygroscopic and deliquescent materials, pellets being formed by a rotary extrusion mechanism that receives the material in the form of snow from a snow chamber, the system having a pair of scraper members for preventing undesired snow build-up on inside walls of the snow chamber, the scraper members operating in a scissors manner for preventing snow build-up on the scraper members. Carbon dioxide gas from the snow chamber can be used for pressurizing a pellet collector that is located under the extrusion mechanism for smoothly and gently feeding the pellets at least 15 feet horizontally to a receiving hopper, the gas pressure within the collector also enabling delivery of the pellets several feet above the bottom of the collector. The pellets can be delivered in excess of 150 feet horizontally from the collector. Also disclosed are a spring connected lid for preventing excess gas pressure in the snow chamber, and a static electrical discharge loop for preventing excessive snow build-up on a vortex flow horn of the chamber.

19 Claims, 1 Drawing Sheet

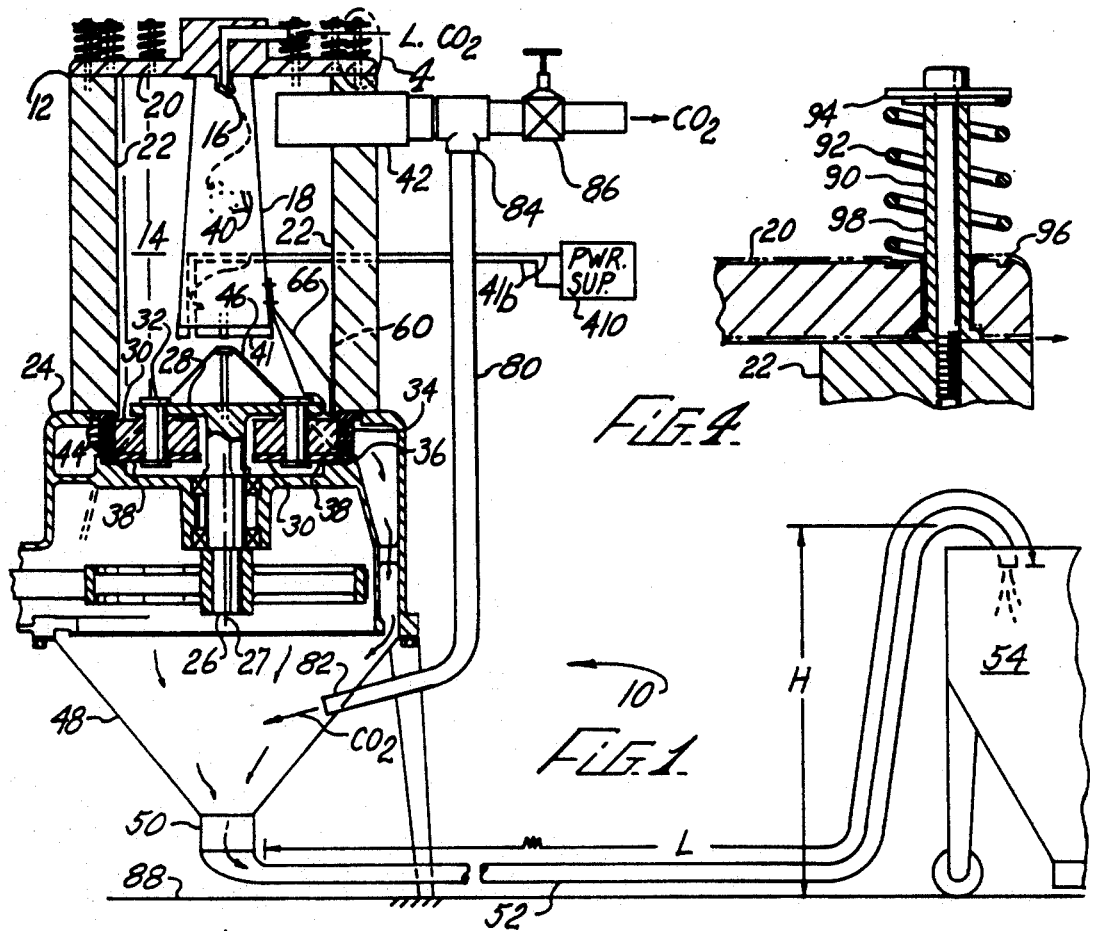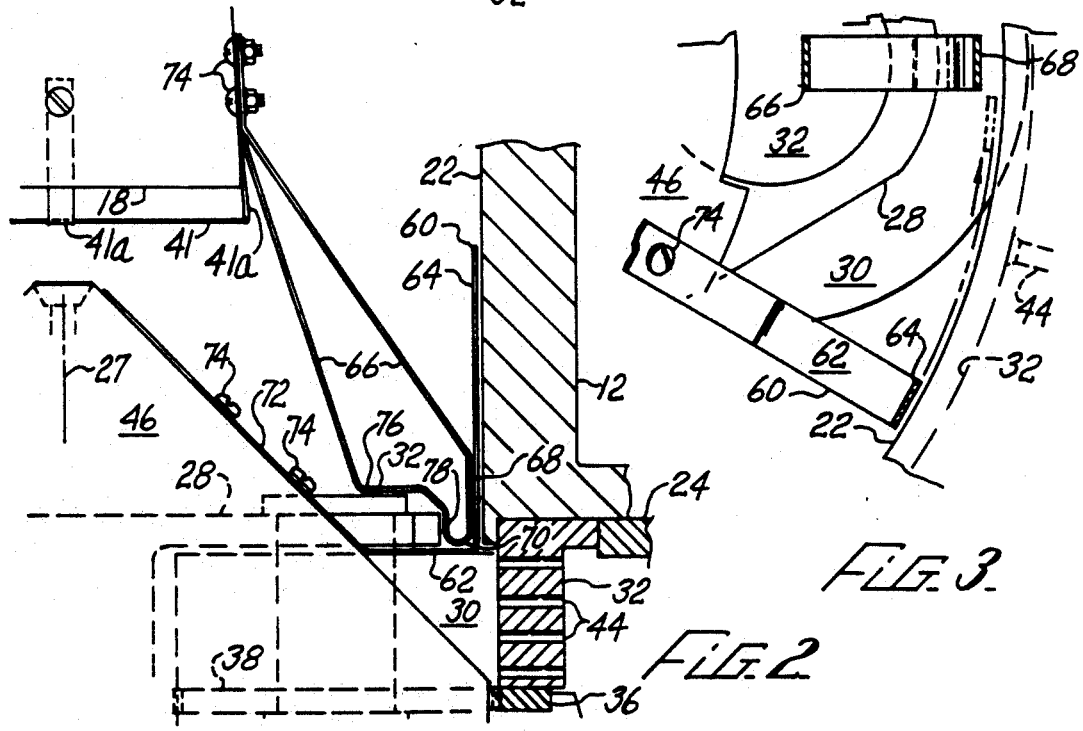

APPARATUS FOR MAKING AND DELIVERING SUBLIMABLE PELLETS

BACKGROUND

The present invention relates to systems for forming and transporting particulate materials, and more particularly to a system for forming and feeding meltable or sublimable pellets at low temperatures.

It is commonly known to blast a workpiece with a particulate abrasive that either melts or sublimes at room temperature for cleanly dissipating the abrasive subsequent to its use, thereby avoiding contamination of the workpiece or its environment. The abrasive can be frozen water, typically called "ice", solid carbon dioxide, typically called "dry ice", or combinations comprising one or both of these materials. One well known process for forming the particulate as dry ice is disclosed in U.S. Pat. No. 4,389,820 to Fong et al., wherein liquid $CO_2$ is dispensed and frozen in a snow chamber, the snow falling into a planetary extruder die mechanism where it is compacted into pellets by being forced through radial holes of a ring-shaped die, the length of the pellets being defined by structure that fractures the material by partially blocking the exit paths from the die.

One problem with pelletizers of this type is that the snow tends to clog in the snow chamber, resulting in interrupted production and/or inconsistent quality of the pellets. This problem has been addressed, for example, in U.S. Pat. No. 3,670,516 to P. Duron et al., which discloses means for mechanically vibrating a cone-shaped snow horn within the snow chamber for shaking off accumulations of the snow therefrom. The Duron et al. patent also discloses a cone-shaped upper portion of the roller carrier, in combination with a leveler strip extending inwardly over the die and rollers for spreading the snow into the path of the rollers. These devices do not fully overcome the problem of clogging, in that the snow is also subject to clogging by accumulating on the inside walls of the snow chamber.

The pellets can be dispensed directly upon formation or they can be stored and/or transported for use upon demand in a hopper or the like. Typically, the pelletizer is permanently or semi-permanently located, the hopper being in a separate mobile unit. In systems wherein the pellets are generated at one location and transferred to a mobile unit for use at a remote work station, the mobile unit typically has an elevated hopper inlet to which the pellets must be lifted from the extruder die mechanism. While mechanisms for lifting and transporting the pellets are known, they contribute undesirably to the expense and complexity of the pelletizer. More importantly, the particles are subject to degradation by subliming, by melting, and by abrasion or pulverization during transport to the workpiece.

Thus there is a need for a particulate formation and delivery system that effectively and reliably feeds the material while avoiding the disadvantages of the prior art.

SUMMARY

The present invention meets this need by providing an apparatus for producing sublimable pellets. In one aspect of the invention, the apparatus includes housing means at least partly defining a snow chamber; snow generating means at least partly within the snow chamber, including nozzle means for feeding a pressurized, cooled liquid, whereby a portion of the liquid solidifies as snow in the snow chamber; pelletizer means for producing the pellets from the snow, the pelletizer means at least partly defining the bottom of the snow chamber and having a carrier member, the carrier member rotating on a carrier axis; and a first scraper member movably supported by the carrier member for repetitively scraping snow from the snow chamber.

The apparatus can further include a second scraper member fixably supported within the snow chamber for scraping snow from the first scraper member. The snow generating means can further include a horn member fixably suspended within the snow chamber and spaced above the pelletizer means, the second scraper member being mounted to the horn member, a bottom extremity of the second scraper member extending to proximate the pelletizer means, a side extremity of the second scraper member extending to proximate the side portion of the snow chamber, the first scraper member extending radially outwardly from a fixed location relative to the carrier member, passing under the bottom extremity of the second scraper member and upwardly between the side extremity of the second scraper member and the side portion of the snow chamber. The second scraper member can include a loop-shaped strip member, opposite end extremities thereof being fastened in overlapping relation against the horn member.

The first scraper member can include an L-shaped blade portion. The pelletizer means can further include a ring die having radial draw holes formed therein, and at least one extruder member rotatably mounted relative to the carrier member for movement within the ring die for extruding the snow through the draw holes, the pellets being formed from the snow passing through the draw holes. Preferably a lower portion of the blade portion can pass above and proximate an upper extremity of the extruder member for scraping snow therefrom. A side portion of the snow chamber can be proximally concentric with the carrier axis, the first scraper member moving proximate the snow chamber side portion. The pelletizer means preferably includes an upwardly convex cone-shaped member extending upwardly from the carrier member for directing snow radially outwardly toward the ring die, the first scraper member being mounted to the cone-shaped member for rotation therewith.

In another aspect of the invention, the apparatus can include the housing means, the snow generating means, the pelletizer means, the first scraper member; a collector for receiving the pellets from the pelletizer means, the collector feeding a material conduit; means for sealingly connecting the collector to the pelletizer means; means for collecting pressurized gas from the snow chamber; and a feed passage for delivering the collected gas to the collector. If desired, the gas can be maintained in the snow chamber at a pressure of not more than approximately 10 psi. The apparatus preferably includes means for maintaining the gas at a pressure within the collector of between approximately 5 inches of water and approximately 10 inches of water for smoothly and gently feeding the pellets.

Preferably control valve means is included in the feed passage for controlling a pneumatic transport velocity of the pellets within the material conduit. Thus the present invention avoids a gas velocity that is too low for transporting the pellets, while also preventing breakage of the pellets resulting from excessive transport velocities. The control valve means can be capable of maintaining a pressure of the gas within the collector between approximately 5 inches of water and approximately 10 inches of water for smoothly and gently feeding the pellets.

The material conduit preferably has a length of at least approximately 15 feet for reaching the collector. The length of the material conduit can be at least approximately 50 feet for reaching a remotely located collector. Alternatively, the length of the material conduit can be at least approximately 150 feet for reaching the collector. The material conduit can extend upwardly by a vertical distance of at least approximately six feet from a lower extremity of the conduit for elevating the pellets.

In another aspect of the invention, the apparatus includes the housing means, the snow generating means, the pelletizer means, the first scraper member, along with the collector for receiving the pellets from the pelletizer, the means for sealingly connecting the collector to the pelletizer, the means for collecting pressurized gas from the snow chamber, and a feed passage for delivering the collected gas to the collector.

In a further aspect of the invention, the apparatus includes the housing means, the snow generating means, a means for controllably feeding the snow from the snow chamber, and means for venting excess gas pressure from the snow chamber including a lid member of the housing means forming a top portion of the snow chamber, the housing means also having a main portion; means for sealingly connecting the lid member to the main portion of the snow chamber; and biasing means for releasably holding the lid member sealingly connected to the main portion of the snow chamber when the snow chamber is pressurized at less than a predetermined safe pressure, at least a portion of the lid member moving away from the main portion of the snow chamber for releasing gas from the chamber when the pressure exceeds the safe pressure.

The apparatus can further include a stem member rigidly connected to the main portion of the housing means and slidably protruding the lid member; and a spring member connected between the stem member and the lid member for holding the lid member against the main portion of the housing means. The main portion of the housing means can be internally substantially cylindrical relative to an approximately vertical axis, the lid member closing an upper end extremity of the main portion. The apparatus can further include a plurality of stem members spaced apart on the main portion of the housing means, a corresponding plurality of the spring members being connected between respective stem members and the lid member. The predetermined safe pressure can be approximately 8 psi.

In a still further aspect of the invention, the apparatus can include the housing means, the snow generating means, including means for generating a descending vortex flow of the fluidic medium from an upper portion of the snow chamber, and a horn member fixably suspended within the snow chamber for guiding the vortex flow, the snow falling below a lower peripheral extremity of the horn member; and radiation means for preventing unwanted snow collection on the horn member. The radiation means can be provided by a conductive loop member that is suspended below the peripheral extremity of the horn member; and means for electrically powering the loop member for discharging static electricity proximate the horn member. The means for electrically powering can provide from approximately 50 to approximately 100 watts of electrical power through the loop member for each pound of snow making fluidic media entering the snow chamber per minute.

DRAWINGS

These and other features, aspects, and advantages of the present invention will become better understood with reference to the following description, appended claims, and accompanying drawings, where:

FIG. 1 is a fragmentary sectional elevational view of a pelletizer and delivery system according to the present invention;

FIG. 2 is a fragmentary sectional detail view of the system of FIG. 1 within region 2 of FIG. 1;

FIG. 3 is a fragmentary plan detail view of a portion of the system portion of FIG. 1 and FIG. 4 is a sectional detail view of the system of FIG. 1 within region 4 thereof.

DESCRIPTION

The present invention is directed to a system for controlled formation and delivery of a particulate medium. With reference to FIGS. 1-3 the drawings, a pelletizer and delivery system 10 includes a housing 12 for defining a snow chamber 14, the housing 12 having an offset inlet nozzle 16 for receiving liquid carbon dioxide ($CO_2$) proximate the upper extremity of the chamber 14, the nozzle 16 being mounted within a cone-shaped horn member 18, the nozzle 16 and the horn member 18 being suspended from a top wall 20 of the housing 12. A cylindrical side wall 22 of the housing 12 is mounted on a casing 24, the casing 24 rotatably supporting a belt-driven, vertically oriented shaft 26 on a carrier axis 27, an upper extremity of the shaft 26 forming a planet carrier 28. A plurality of extruders or planet rollers 30 are rotatably mounted on respective vertically oriented planet axle 32, the rollers 30 rolling against or proximately against the inside of a die ring 34. Synchronism of the rollers 30 with the die ring 34 is maintained by toothed engagement of a ring gear 36 with respective planet gears 38 that rotate with the rollers 30.

When liquid $CO_2$ is fed through the nozzle 16, powdered "dry ice" or snow 40 is formed within the horn member 18, the snow 40 descending in a vortex flow pattern from the horn member 18, as indicated by the dashed arrows in FIG. 1, the snow 40 emptying into a lower portion of the snow chamber 14. The vortex pattern tends to keep the horn member 18 free of excess accumulation of the snow 40 by centrifugal separation of the gaseous $CO_2$ from the snow 40. In accordance with the present invention, a ring-shaped static discharge wire 41 is suspended slightly below the bottom edge of the horn member 18 by a plurality of insulative strap members 41a as shown in FIG. 1 and further described below, the wire 41 having suitable connections 41b to an ionizer or electrical power circuit 410. A suitable material for the static discharge wire 41 is a nickel-chromium alloy. The wire 41 emits infra-red and/or optical radiation that is received by the snow 40.

The power circuit 410 has been found effective in discharging static electricity and limiting unwanted accumulations of the snow 40 on the horn member 18 by delivering from 12 to 16 volts at from about 40 to 60 amps of alternating current to the wire 41, when the flow rate of liquid $CO_2$ into the snow chamber 14 is approximately 10 lb/min. Similarly favorable results also occur when the wire 41 is driven with direct current. Thus it is believed that ionization from heating by the discharge wire 41 is particularly effective for avoiding the unwanted accumulations of the snow 40 on the horn member 18 at power levels of from about 50 to about 100 watts per pound of $CO_2$ per minute. The wire 41, being supported uniformly spaced below the bottom edge extremity of the horn member 18 as described above, advantageously directs the ionization where it is most efficiently utilized. It is further believed that removal of static electricity is enhanced by the presence of vortex flow, wherein the snow 40 is entrained proximate the wire 41 for a greater duration of time than would occur without the vortex flow.

A gas outlet 42 protrudes an upper portion of the side wall 22 for exhausting gaseous $CO_2$ from the snow chamber as further described below. The snow 40 is directed to within the die ring 34 and is extruded through a multiplicity of radial draw holes 44 of the ring 34 by the rollers 30 during rotation of the shaft 26, a cone-shaped nose member 46 being mounted to the carrier 28 and concentric with the shaft 26 for deflecting the snow 40 outwardly toward the die ring 34. The extruded snow 40 exiting from the draw holes 44 is formed into pellets 47 by suitable means (not shown), the pellets falling into a collector 48 as indicated by the curved arrows in FIG. 1, the collector 48 having a bottom outlet 50 for delivery of the pellets 47 through a delivery conduit 52 to a hopper 54 as further described below. Further details of the snow chamber 14, the casing 24, the planet rollers 30, the die ring 34, the gears 36 and 38, etc. are known by those having skill in the art, being further described in U.S. Pat. No. 3,670,516 to Duron et al.

According to the present invention there is provided means for preventing excessive build-up of the snow 40 against the side wall 22 of the snow chamber 14 as described herein. For this purpose, a scraper member or first blade 60 is mounted in fixed relation to the shaft 26, a lower portion 62 of the first blade 60 extending radially outwardly to proximate the bottom extremity of the side wall 22 of the housing 12 and approximately in line with the tops of the rollers 30, an outer portion 64 of the blade 60 further extending vertically upwardly in close proximity to the wall 22, to an elevation approximately in line with the bottom of the horn member 18, the lower and outer portions 62 and 64 forming an L-shaped blade portion. The first blade 60 rotates with the shaft 26 for scraping snow 40 from the side wall 22, the wall 22 being formed concentrically with the shaft 26. Thus the snow 40, rather than being subject to excessive accumulation in the side wall 22, is promptly removed therefrom by the first blade member 60, the snow 40 falling directly within the die ring 34, into the path of the rollers 30.

In further accordance with the present invention, the system 10 preferably includes another scraper member or second blade 66 is fixedly mounted within the snow chamber 14 in close proximity to the path of the first blade 60 for preventing excess build up of the snow 40 on the first blade 60. The second blade 66 has a vertically oriented outside portion 68 that extends upwardly from proximate the bottom of the side wall 22 toward the upper extremity of the path of the outside portion 64 of the first blade 60. A bottom portion 70 of the second blade 66 extends from the outside portion 68 inwardly proximate the path of the lower portion 62 of the first blade 60. The first blade 60 thus makes a scissors-like movement relative to the second blade 66 whereby the snow 40 that is scraped from the side wall 22 is reliably fed into the path of the rollers 30, without producing excessive build up of the snow 40 on the side wall 22 or either of the blades 60 and 66.

In an exemplary configuration of the present invention that is shown in the drawings, the first blade 60 is formed of a metallic strip of uniform rectangular cross section, the blade 60 having a sloping inner portion 72 that extends inwardly and upwardly in the nose member 46, being fastened thereto by a pair of threaded fasteners 74. Similarly, the second blade 66 is also metallic, having the same uniform cross section as the first blade 60, the second blade having a looped configuration that slopes downwardly and outwardly from the horn member 18, opposite ends of the second blade 66 being fastened in overlapping relation to the horn member 18 by counterparts of the fasteners 74. These and further counterparts of the fasteners 74 are also used for mounting the straps 41a for supporting the static discharge wire 41, described above. The second blade 66 is also formed for scraping the snow 40 from portions of the planet carrier 28 and the planet axles 32 as indicated at 76 and 78, respectively.

In a further aspect of the present invention, a feed passage 80 is connected between the gas outlet 42 and the collector 48 for pressurizing the collector with the collected gas. As shown in FIG. 1, a downwardly sloping end extremity 82 of the feed passage 80 extends slightly into the collector 48 for preventing the pellets 47 from impacting sharp edges within the collector. A tee fitting 84 is provided in the feed conduit 80 proximate the gas outlet 42, the fitting 84 being vented through a control valve 86 for maintaining a controlled moderate pressure of the gaseous $CO_2$ within the collector 48 for promoting the delivery of the pellets 47 from the collector and through the delivery conduit 52.

The gas within the collector is preferably maintained at a pressure of between approximately 5 inches of water and approximately 10 inches of water for smoothly and gently feeding the pellets 47. The control valve 86 is operative for controlling a pneumatic transport velocity of the pellets 47 within the delivery conduit 52, the pressure within the snow chamber 14 being normally not more than approximately 10 psi. (Higher pressures within the show chamber 14 are also contemplated, such as for enhancing the efficiency of production of the snow 40 from the liquid $CO_2$.) The delivery conduit 52 has a length L that can be at least approximately 15 feet for reaching the hopper 54. Preferably the length L is at least approximately 50 feet for reaching the hopper 54 when it is remotely located from the collector 48. Further, the delivery conduit 52 can extend upwardly by a vertical distance H above a supporting surface 88 of the apparatus 10 that is at least approximately six feet, a lower extremity of the delivery conduit 52 also being supported on the surface 88, for elevating the pellets 47 into the hopper 54.

The use of the exhausted $CO_2$ gas for controllably pressurizing the collector 48 advantageously preserves the pellets 47 prior to and during delivery thereof in that the exhausted gas is quite cold, not requiring further cooling or refrigeration. The pellets 47, being formed of a hygroscopic or deliquescent material, are subject to degradation by excessive agitation, from heating, wear and pulverization, and by absorbing moisture. The exhausted gas, being produced from the liquid $CO_2$, is advantageously completely free of moisture. Moreover, the gas, being the same chemical compound, is less likely to degrade the pellets 47 than other gases that might otherwise be used for pressurizing the collector. The controlled application of relatively low pressure further contributes to preservation of the pellets 47 by avoiding high-velocity impacts between the particles and the structure or others of the particles. In testing of an experimental prototype of the system 10 as described herein, the pellets 47 have been successfully delivered from the conduit 52 with the length L being in excess of 150 feet. It will be understood that cold $CO_2$ gas for pressurizing the collector 48 is also available from a tank or other source of the liquid $CO_2$, from $CO_2$ gas passing from within the die ring 34 into the casing 24, or from a recycler (not shown) of the $CO_2$ gas.

With further reference to FIG. 4, yet another aspect of the present invention is a preferred safety mounting of the top wall 20 to the snow chamber housing 12 by means of a plurality of spring-loaded elongated cap screws 90 that threadingly engage the housing 12. The screws 90 protrude and extend above the top plate 20 for downwardly loading respective helical compression springs 92 against the top plate 20 by means of corresponding shoulder washers 94. An annular depression 96 is also formed in the top plate 20 for facilitating concentric location of each compression spring 20 about the associated cap screw 20. In this configuration of the present invention, any excessive pressure build-up within the snow chamber 14 is rapidly released during lifting of the top plate 20 from its normal sealing contact against the housing 12. The limiting pressure within the snow chamber 14 is predetermined by appropriate selection of the compression springs 92 and the cap screws 90, and/or by adjustment of the cap screws 90. In an exemplary configuration of the safety mounting as shown in the drawings, a shoulder spacer 98 controls a desired preload of the spring 20 when the respective cap screw 90 is tightened. Advantageously, the present invention provides a very large area through which abnormally high-pressure gas can escape from the chamber 14. This in important feature of the delivery system 10 in its preferred form, because a conventional pressure-relief valve, if present, can easily get clogged by the snow 40. Also, the application of the exhausting $CO_2$ gas to the collector 48 tends to increase the normal pressure within the snow chamber 14. Further, the occurrence of a blockage of the bottom outlet 50 or the delivery conduit 52 could limit or prevent the flow of the $CO_2$ from the chamber 14, unless the control valve 86 is fully open.

Although the present invention has been described in considerable detail with reference to certain preferred versions thereof, other versions are possible. For example, the wire 41 can be provided with a substance that emits gamma radiation for effecting deionization of the snow 40. Also, the shoulder spacers 98 can be plain spacers, or the cap screws 90 can be shoulder screws for limiting the preload of the springs 92. Therefore, the spirit and scope of the appended claims should not necessarily be limited to the description of the preferred versions contained herein.

What is claimed is:

1. Apparatus for producing sublimable pellets, comprising:
    (a) housing means at least partly defining a snow chamber;
    (b) snow generating means at least partly within the snow chamber, including nozzle means for feeding a pressurized, cooled liquid, whereby a portion of the liquid solidifies as snow in the snow chamber;
    (c) pelletizer means for producing the pellets from the snow, the pelletizer means at least partly defining the bottom of the snow chamber and having a carrier member, the carrier member rotating on a carrier axis; and
    (d) a first scraper member movably supported by the carrier member for repetitively scraping snow from the snow chamber.

2. The apparatus of claim 1, further comprising a second scraper member fixably supported within the snow chamber for scraping snow from the first scraper member.

3. The apparatus of claim 2, wherein the snow generating means further comprises a horn member fixably suspended within the snow chamber and spaced above the pelletizer means, the second scraper member being mounted to the horn member, a bottom extremity of the second scraper member extending to proximate the pelletizer means, a side extremity of the second scraper member extending to proximate the side portion of the snow chamber, the first scraper member extending radially outwardly from a fixed location relative to the carrier member, passing under the bottom extremity of the second scraper member and upwardly between the side extremity of the second scraper member and the side portion of the snow chamber.

4. The apparatus of claim 3, wherein the second scraper member comprises a loop-shaped strip member, opposite end extremities of the strip member being fastened in overlapping relation against the horn member.

5. The apparatus of claim 3, wherein the first scraper member comprises an L-shaped blade portion.

6. The apparatus of claim 5, wherein the pelletizer means further comprises:
    (i) a ring die having radial draw holes formed therein; and
    (ii) at least one extruder member rotatably mounted relative to the carrier member for movement within the ring die for extruding the snow through the draw holes, the pellets being formed from the snow passing through the draw holes.

7. The apparatus of claim 6, wherein a lower portion of the blade portion passes above and proximate an upper extremity of the extruder member for scraping snow therefrom.

8. The apparatus of claim 6, wherein a side portion of the snow chamber is proximally concentric with the carrier axis, the first scraper member moving proximate the snow chamber side portion.

9. The apparatus of claim 8, wherein the pelletizer means includes an upwardly convex cone-shaped member extending upwardly from the carrier member for directing snow radially outwardly toward the ring die, the first scraper member being mounted to the cone-shaped member for rotation therewith.

10. Apparatus for producing sublimable pellets, comprising:
    (a) housing means at least partly defining a snow chamber;
    (b) snow generating means at least partly within the snow chamber, including nozzle means for feeding a pressurized, cooled liquid, whereby a portion of the liquid solidifies as snow in the snow chamber;

(c) pelletizer means for producing the pellets from the snow, the pelletizer means at least partly defining the bottom of the snow chamber and having a carrier member, the carrier member rotating on a carrier axis;

(d) a first scraper member movably supported by the carrier member for repetitively scraping snow from the snow chamber;

(e) a collector for receiving the pellets from the pelletizer means, the collector feeding a material conduit;

(f) means for sealingly connecting the collector to the pelletizer means;

(g) means for collecting pressurized gas from the snow chamber; and (h) a feed passage for delivering the collected gas to the collector.

11. The apparatus of claim 10, wherein the gas is maintained in the snow chamber at a pressure of not more than approximately 10 psi.

12. The apparatus of claim 11, further comprising means for maintaining the gas at a pressure within the collector of between approximately 5 inches of water and approximately 10 inches of water for smoothly and gently feeding the pellets.

13. The apparatus of claim 10, further comprising control valve means in the feed passage for controlling a pneumatic transport velocity of the pellets within the material conduit.

14. The apparatus of claim 13, wherein the control valve means is capable of maintaining a pressure of the gas within the collector between approximately 5 inches of water and approximately 10 inches of water for smoothly and gently feeding the pellets.

15. The apparatus of claim 10, wherein the material conduit has a length of at least approximately 15 feet for reaching the collector.

16. The apparatus of claim 15, wherein the length of the material conduit is at least approximately 50 feet for reaching a remotely located collector.

17. The apparatus of claim 15, wherein the length of the material conduit is at least approximately 150 feet for reaching the collector.

18. The apparatus of claim 10, wherein the material conduit extends upwardly by a vertical distance of at least approximately six feet from a lower extremity of the conduit for elevating the pellets.

19. Apparatus for producing sublimable pellets, comprising:

(a) housing means at least partly defining a snow chamber;

(b) snow generating means at least partly within the snow chamber, including nozzle means for feeding a pressurized, cooled liquid, whereby a portion of the liquid solidifies as snow in the snow chamber;

(c) pelletizer means for forming the pellets from the snow, the pelletizer means at least partly defining the bottom of the snow chamber and having a rotating carrier member;

(d) a first scraper member rotatably supported by the carrier member for scraping snow from the snow chamber, the snow falling into the pelletizer means;

(e) a collector for receiving the pellets from the pelletizer means, the collector feeding a material conduit;

(f) means for sealingly connecting the collector to the pelletizer means;

(g) means for collecting pressurized gas from the snow chamber; and (h) a feed passage for delivering the collected gas to the collector.

* * * * *